3,156,661
Patented Nov. 10, 1964

3,156,661
INSECTICIDAL WATER-BASED, SELF-POLISHING COATING COMPOSITIONS
Irving Feinberg, Sanford, Fla., assignor to Chemical Corporation of America, Tallahassee, Fla., a corporation of Florida
No Drawing. Filed Nov. 13, 1961, Ser. No. 152,037
10 Claims. (Cl. 260—28.5)

This invention relates to water-based coating compositions of the kind which dry to a bright filimous protective coating which is insecticidal to ants, water bugs, roaches and the like insect life, to aqueous dispersions of film forming material useful in the preparation of such compositions and to methods of preparing such compositions and dispersions. A principal objective of the invention is the provision of a method which may be used for incorporating insecticidal material in resinous latex polymers employed in the preparation of such coating compositions.

Self-polishing coating compositions are well known in the art and are usefully employed in the home and elsewhere for polishing such flooring materials as terrazzo, vinyl tiles, wood and linoleum. They are water-based compositions which have a continuous aqueous phase in which solid film forming material is dispersed, and upon application to a surface to be coated dry to a bright protective surface coating without the need for buffing.

One of the problems involved in preparing residual insecticide containing coating compositions is resident in the selection of the insecticide to be used. Although various types and kinds of insecticidal materials are known, many are unacceptable for one or more reasons. To be useful in such compositions, the insecticides should be water insoluble so as to resist removal from the coatings by the usual washing procedures to which such coatings are subjected. They should also be sufficiently effective as insecticides to be usable in small amounts so as not to adversely influence the physical properties of the coatings, and in this respect should also be solid materials as opposed to liquid materials so as to avoid undue plasticization of the films.

The insecticidal materials which may be employed in the process of the invention described hereinafter are chlorinated hydrocarbon type insecticidal materials which are water insoluble normally solid meltable compounds, and more particularly are the gamma isomer of 1,2,3,4,5,6-hexachlorocyclohexane, hereinafter referred to as "lindane," and the endo-exo isomer of 1,2,3,4,10,10-hexachloro - 6,7-epoxy-1,4,5a,5,6,7,8,8a-octahydro-1,4,5, 8-dimethanonaphthalene, hereinafter referred to as "dieldrin." Such materials are the most practical compounds for use in compositions of the type contemplated herein of which I am aware and are particularly effective when used in small amounts for killing ants, roaches, water bugs and the like insect life which is commonly encountered in the home. However, one of the problems encountered in using such insecticidal materials involves their solid phase compatibility or lack of compatibility with the film forming components which enter into the make-up of such compositions. As seen in my copending application S.N. 579,437 filed April 20, 1956, now Patent No. 3,008,871, the solid meltable chlorinated hydrocarbon type insecticides are generally incompatible with the waxes which are commonly employed in such compositions, and are only compatible with the solid meltable type resinous wax extenders which may be used in formulating such compositions in limited amounts. Because of the limited compatibility of dieldrin and lindane with the waxy material employed in formulating such water-based coating compositions, there is the problem of including sufficient quantities of such insecticides in the finished compositions to render the coatings effectively insecticidal to insect life.

For example, it is the usual procedure in preparing coating compositions of the water-based self-polishing type to first prepare a so-called "base emulsion" of waxy material, and to thereafter add such other materials as enter into the finished composition thereto. Such base emulsions are prepared by dispersing a melt of waxy material in hot water to form a waxy emulsion, the emulsion being thereafter cooled to solidify the dispersed phase particles. The suspension resulting upon cooling is usually termed a "base emulsion" although actually being a suspension in which the dispersed phase is solid material. When a dispersible melt composed of one or more of the chlorinated hydrocarbon insecticidal materials and one or more of the commonly employed waxes is prepared and then dispersed in hot water to form the emulsion, most of the insecticidal material precipitates from the emulsion as the latter is cooled to solidify the dispersed melt particles. Because of this solid phase incompatibility of the waxes and chlorinated hydrocarbon type insecticides, it is impossible to use the waxes per se as dispersed phase carriers for the solid meltable type chlorinated hydrocarbon type insecticides. In accord with certain aspects of the process disclosed in the aforementioned application, effective quantities of such insecticidal materials may be stabilized or maintained in the dispersed solid phases of the emulsions by including sufficiently large amounts of the solid meltable resinous type wax extenders in the melts and by co-dispersing the insecticides with the wax extenders. Without the use of such wax extenders or with the use of insufficient amounts thereof, the insecticides or at least a portion thereof precipitate from the base emulsions as the latter are cooled to solidify the dispersed melt particles and thereby separate from the emulsion and collect at the bottom of the vessel. This, of course, is undesirable, and limits the formula for the finished coating composition to the use of large amounts of wax extending type solid meltable resinous materials in order to incorporate effectively insecticidal amounts of the insecticides in the dispersed components of the finished compositions.

Film forming materials other than the waxes and wax extenders which are frequently included in the finished self-polishing coating compositions, are resinous latex polymers and so-called "alkali soluble" resins. The former are resinous polymeric materials which are synthetic products of the emulsion polymerization of vinyl monomeric material, and are available to the formulators as polymer latexes in which the emulsion or so-called latex polymer is dispersed in the aqueous medium employed in the polymerization process. As such, when the emulsion polymers are employed they are merely admixed with the so-called base emulsions. The alkali soluble resins, on the other hand, are incorporated when employed in the coating formulations by initially dissolving the resins in alkali, and mixing the resulting alkaline solutioins with the so-called base emulsions.

In recent years the resinous latex polymers, such as the acrylic and styrene resins produced by emulsion polymerization procedures have been used in increasingly larger amounts in such coating compositions, and are gradually replacing the use of the solid meltable type wax extenders as film forming components of the compositions because of the better physical properties, such as hardness and color retention, which can be built into such resinous materials in their preparation for reasons of the wide selection of monomers which may be combined in the emulsion polymerization procedure for obtaining such resinous products. As such there is need for a method of incorporating such insecticidal materials as lindane and dieldrin in the dispersed components of the coating compositions without the necessity for relying on the wax extenders as carriers for the insecticides. It is highly desirable that the method provide for the incorporation of the insecticidal materials in the resinous latex polymers, so that such components may be employed as dispersed carriers. Since the insecticides heretofore mentioned are available in bulk, as solid products and must accordingly be dispersed, it is also desirable that the method permit the co-dispersion of the insecticidal material with the waxy material used in preparing the so-called base emulsion.

One object of the invention is to provide a method of incorporating insecticidal material such as lindane and dieldrin in the dispersed components of water-based self-polishing coating compositions, and which enables the preparation and the dispersion of the insecticidal material with the film forming material used in preparing the base emulsions.

Another object is to provide a process by which latex polymers of the acrylic and styrene resinous types may be caused to serve as carriers for at least a portion of the insecticidal material employed in the preparation of coating compositions of the self-polishing type.

Still another object is to provide a simple procedure which may be followed by the formulators of self-polishing coating compositions to incorporate insecticidally effective amounts of such insecticidal materials in the finished compositions and which enables a wide choice in the type and amount of waxy material which may be employed in the formulation of such compositions.

In accord with the process, a dispersible waxy material containing melt is first prepared which contains the insecticidal material and the waxy material in incompatible amounts, i.e., the insecticidal material is included in the melt in an amount which exceeds the dispersed solid phase compatibility of the insecticidal material with the dispersible film forming components of the melt and which excess would normally precipitate from the aqueous emulsion which is thereafter prepared from the melt as the emulsion is cooled to solidify the dispersed components thereof. The molten mixture of insecticidal material and waxy material is then dispersed in hot water to emulsify the dispersed components and thereafter cooled to solidify the dispersed particles. However, prior to cooling the emulsion to the point where the excess insecticidal material starts to precipitate out of the emulsion, and in accord with invention, a resinous polymer latex is mixed with the emulsion to disolve the insecticidal material as it is expressed from the melt particles. Upon cooling, the dispersion resulting from the admixture of the latex and the emulsion may then be employed as a base dispersion to which suitable alkali soluble resin solutions and additional latex polymeric material as well as other film modifiers such as plasticizers may be added when desired in the finished compositions.

Apparently the physical state of the insecticidal material as the dispersed melt particles solidify and expel the insecticidal material from the dispersed film forming materials is such that the dispersed particles of resinous polymeric material readily dissolve the insecticidal material. Attempts to secure similar results by dispersing finely ground insecticidal material in a polymer latex at elevated temperatures have met with no pratical success because of the long contact periods which are required to obtain comparable results, and for the further reasons that such procedures require separate processing steps which may otherwise be combined or eliminated in accord with the process described herein. Furthermore, it appears that a stable solid solution of the excess insecticide in the resinous latex polymer results from the process. For example, lindane which is sensitive to and destroyed by prolonged contact with alkaline conditions may be used in the process of the invention, and when the base dispersion resulting from the admixture of the emulsion and latex is thereafter employed in the formulation of a self-polishing coating composition in which the continuous aqueous phase is rendered alkaline by reasons of the inclusion of an alkaline solution of a so-called alkali soluble resin, the lindane is nevertheless unaffected by the alkaline conditions and such coating compositions upon use are nevertheless found to provide insecticidally effective coatings even though the compositions have been retained on the shelf for long periods.

The latexes employed in the process of the invention contain dispersed water insoluble thermoplastic vinyl polymeric material which is obtained by the addition polymerization of vinyl monomeric material by emulsion polymerization procedures. In general, the invention contemplates the use of latexes in which the dispersed vinyl polymeric material is predominantly composed of monomer units which are derived from one or more monomers in the group consisting of styrene and the esters of the acrylic and methacrylic acids, such as the acrylic and styrene resins.

The acrylic resins are well known in the art and are synthetic water insoluble thermoplastic vinyl polymeric materials which are composed of organic polymers that have a polymer structure which is predominantly composed of monomer units derived from the esters of acrylic and methacrylic acids. As such, the dispersed vinyl polymeric material may be considered as being composed predominantly of monomer units derived from the esters of such acids. Typical esters of such acids which are employed in preparing latexes of the acrylic resins for use in self-polishing coating compositions are the methacrylic and acrylic acid esters of the $C_1$-$C_8$ monohydric alcohols, such as methyl methacrylate, hexyl methacrylate, butyl methacrylate, ethyl acrylate, and 2-ethyl hexyl acrylate, although acid esters of higher monohydric alcohols having as many as 18 carbon atoms, such as stearyl methacrylate are also occasionally employed in the emulsion polymerization procedures involved in the preparation of the latexes. The acrylic resins may be composed of homopolymers of such monomers, or copolymers of one or more of such acid ester monomers, or may be composed of copolymers of one or more of such monomers with other vinyl or monoethylenically unsaturated comonomers whic hare copolymerizable therewith by conventional emulsion polymerization procedures, typical comonomers commonly employed in preparing the acrylic resin latexes being styrene, acrylonitrile, acrylamide, itaconic acids, methacrylic acids and acrylic acid to name but a few.

The styrene resins are also well known synthetic water-insoluble thermoplastic vinyl polymeric materials and are composed of organic polymers that have a polymer structure which is predominantly composed of monomer units derived from styrene. As such the dispersed polymeric material in styrene resin latexes may be considered as being composed predominantly of monomer units which are derived from styrene. The styrene resins may be composed of homopolymers of styrene, or copolymers of styrene with one or more other comonomers which are polymerizable therewith by conventional emulsion polymerization procedures such as the methacrylic and acrylic acid esters heretofore mentioned, as well as such other comonomers such as acylonitrile, acrylamide, itaconic acids, methacrylic acid and acrylic acid to name but a few.

Latexes containing such resinous materials and methods for their preparation for use in water-based self-polishing coating compositions are well known and in general the latexes are composed of dispersed particles of the emulsion polymers which are less than .1 micron in size because of the superior dry bright characteristics associated with such sizes.

One of the advantages of the process lies in the wide selection of waxy materials which may be employed in the preparation of the so-called base emulsions and without the necessity for including large amounts of a wax extender in order to render the insecticide compatible with the dispersed film forming components thereof. The waxy material may be composed solely of one or more of the natural or synthetic waxes which are commonly employed in the preparation of such coating compositions, or may be composed solely of one or more of the resinous wax extenders which are commonly employed in such compositions, and of course may also be composed of mixtures of such waxes and wax extenders. Typical waxes with which the insecticidal materials are incompatible and which are commonly employed in self-polishing coating compositions are carnauba wax, candellila wax, the oxidized microcrystalline waxes and the low molecular weight synthetic polyethylene waxes, to name but a few. Among the resinous wax extenders which may be incorporated in the melts to function as dispersed phase carriers for a portion of the insecticide and which are commonly employed in the preparation of self-polishing coating compositions may be mentoned, the water insoluble solid meltable polyterpenes, terpene phenolics, coumarone-indenes, and the resinous products of the condensation of maleic acid with the glycerol esters of the rosin acids, among others.

In carrying the invention into practice a dispersible melt which contains the waxy material and the insecticidal material in incompatible amounts is first prepared. To effect dispersion and emulsification of the melt a suitable dispersing agent is incorporated in the melt, any one or more of the dispersing agents usually employed for such purposes being contemplated for use in the process. Suitable dispersing agents may be the alkali metal or amine soaps of the higher fatty acids, preferably the amine soaps of such unsaturated fatty acids as oleic acid, linoleic acid, and the tall oil fatty acids. The ammonia, morpholine and 2-amino-2-methyl-1 propanol soaps of such unsaturated fatty acids are preferred because of their dispersive qualities and resistance to water spotting in the final films, the latter quality being due to the volatility of the amine as the filimous coatings dry as is well known. The coaps may be added to the melts as such, or formed in situ, the latter being the usual and preferred practice in the preparation of most base emulsions, and the amount of dispersing agent employed is, of course, dependent upon the particular dispersing agent and should be adequate to obtain the fine particle sizes characteristic of such coating compositions as is well known.

The amount of insecticidal material incorporated in the preparation of the coating compositions should be sufficient to provide an amount of insecticidal material in the ultimate coatings derived from the finished compositions which will effectively render the coatings insecticidal to such insect life as previously mentioned. In accord with the process, all or a fraction of the insecticidal material may be included in the melt during the preparation of the so-called base emulsion, it being contemplated that a portion of the insecticidal material may be incorporated in the finished composition by other methods, such as those disclosed in my copending application, Serial No. 152,037, filed as of the date of this application on November 13, 1961 and entitled "Polymer Latexes and Processes." As seen in this copending application the insecticides may be directly incorporated in the emulsion polymers during the polymerization procedures and the residual insecticide containing latexes marketed for use in coating compositions of the water-based type. As such a portion of the insecticidal material incorporated in the finished coating compositions which include base dispersions prepared by the process herein may be incorporated by admixing such residual insecticide containing latex polymers with the base dispersions. In any event, however, the amount of insecticidal material which is used in the preparation of the melt by the process of the invention is such as to exceed the dispersed solid phase compatibility of the insecticidal material with the dispersible film forming components of the melt, and accordingly if the melt was thereafter dispersed in hot water and cooled to solidify the dispersed film forming maerial in the normal manner without the addition of a latex polymer, the excess insecticidal material would precipitate from the emulsion. Thus, in following the normal procedures for cooling the wax emulsion to room temperature without additions such as are contemplated by the inventive concept, the excess or "incompatible amount" of insecticidal material would start to precipiate from the emulsion as the dispersed melt particles solidify, and would continue to precipitate and collect at the bottom of the container as the dispersed material solidifies until the materials in the dispersed phase are present in compatible amounts.

The dispersing of the melt to form the emulsion may be accomplished in the usual manner as by adding the melt with vigorous stirring to hot water which is at a temperature approximately the same as that of the melt at the time of the addition so as to avoid splattering, as is well known.

The amount of resinous latex polymer employed in carrying the process into practice depends on the particular formulation for the finished coating composition, and the extent to which the process is to be used as a means for including the insecticidal material in the dispersed components of the finished coating composition. For example, in the process of my copending application, a stable resinous latex polymeric material containing a residual insecticide may be prepared by directly including the insecticide in the monomer during the polymerization procedure. Latexes resulting from this process may be marketed as latex material in which the insecticide is present in a fixed and more highly concentrated form than desirable in the finished compositions. However, in using such residual insecticide containing latexes in the finished coating compositions, the formulators of such compositions are limited in their choice of residual insecticide containing emulsion polymers to those which are available on the market, and accordingly may desire to include less of such polymer in the finished compositions than necessary to obtain effectively insecticidal coating so as to limit the effect of such polymer on the overall physical properties of the coatings derived therefrom. In such cases it may be desirable to include the balance of the insecticidal material for the finished composition by the procedures set forth herein.

The amount of resinous latex polymeric material employed in the process also depends on the amount and kind of wax and/or wax extender employed in forming the wax emulsion as well as the amount of and types of latex polymers to be employed in the finished compositions. Obviously, when the amount of waxy material employed in the finished composition is sufficient and of the kind, when employed in the preparation of the wax emulsion, to form compatible dispersed solid phase solutions with all of the insecticidal material included in the melt, the process described herein need not be employed. On the other hand when the kind of waxy material and the amount employed in the finished coating composition is incapable of forming or insufficient to form a compatible dispersed solid phase solution with the insecticidal material, the amount of latex polymeric material added in accord with the process will depend on the amount of insecticide which would normally precipitate upon cooling the wax emulsion.

In order to avoid the necessity for filtering the base dispersions produced by the process, the amount of latex polymer admixed with the freshly prepared waxy material containing emulsion should be sufficient to dissolve the excess or incompatible amount of insecticide which would normally precipitate from the emulsion by reasons of cooling the emulsion to solidify the emulsified waxy material. In general, the amount of resinous polymer added to the emulsion to stabilize the excess insecticide in the dispersed components of the mixture will also depend on the solubility characteristics of the dispersed polymeric material in the latex as evidenced by its use in the process. The monomers which are employed in preparing the film forming resinous latex polymers used in the process may be generally classified according to the hardness of their homopolymers as is well known, styrene and methylmethacrylate being typical "hard" monomers which are generally considered to form hard discontinuous film forming homopolymers, whereas such "soft" monomers as ethyl acrylate and 2-ethylhexyl acrylate form polymers which are softer and which are considered to form continuous films. In general, polymers derived mainly from the hard monomers have poorer solubility characteristics than do polymers which are derived mainly from the soft monomers. As such when substantially all of the insecticidal material is to be included in the latex polymeric material used in the process described herein, the latex should contain resinous polymeric material which is derived from appreciable amounts of the softer monomers so as to provide the desired solubility characteristics. Although it is recognized that hardness of the films is one of the desired properties in coatings of the self-polishing types and thus makes it especially desirable to use polymeric material which is derived from the harder monomers, latexes which are blends of emulsion polymers that are respectively derived from the hard and soft monomers may be employed, as well as latexes which contain copolymeric material derived from both types of monomers. For example, as might be expected, resinous copolymers of styrene and ethyl acrylate, have been found to have solubility characteristics generally between those exhibited by the homopolymers of such monomers. In general, however, the amount of latex polymeric material admixed with the waxy material containing emulsions may be readily determined by simple trial and error procedures which will depend on the particular formulation being employed to prepare the finished coating composition.

The base dispersion which results from mixing the latex with the wax emulsion contains discrete particles of waxy material and discrete particles of the latex polymeric material employed, a portion of the insecticide initially incorporated in the melt for the emulsion being present in the particles of waxy material and another portion being present in the particles of the latex polymeric material.

The process is further illustrated by the following examples:

*Example I*

*Wax Emulsion I.*—A wax emulsion containing an incompatible amount of lindane was prepared as follows: An initial melt composed of 8 parts of oleic acid, 17.8 parts of a synthetic low molecular weight emulsifiable polyethylene wax marketed by Eastman Chemical Products, Inc. of Kingsport, Tennessee, under the designation Epolene LVE, and 17.8 parts of an oxidized microcrystalline wax, marketed by the Warwick Wax Division of the Western Petrochemical Corporation under the designation Cardis Polymer 10 was prepared by heating the materials together to form a molten mixture thereof. Both waxes are commonly employed in preparing self-polishing coating compositions and have the following characteristics:

| | Cardis Polymer 10 | Epolene LVE |
|---|---|---|
| Saponification Value | 25–30 | 25–30 |
| Acid Value | 8–10 | 12–16 |
| Melting Point, ° C | 100–102 | 104–105 |

The molten mixture was then cooled to about 113–116° C. While the melt was at this temperature 16 parts of lindane was added and the melt stirred until the insecticidal material was completely melted therein. Thereafter, the insecticide containing melt was cooled to 99° C. and a boiling solution of 0.2 part caustic potash and 2.5 parts borax in 30 parts water was slowly added to the melt with stirring to emulsify the water therein and thereby avoid destruction of the alkaline sensitive lindane by reaction with the morpholine to be thereafter added to form the dispersing agent for the emulsion. Thereafter 6.2 parts of morpholine was added to the melt to form the soap and the melt stirred for about five minutes thereafter to enable the formation of the morpholine oleate. The dispersible melt was then rapidly added with vigorous stirring to 301.5 parts of boiling water to disperse the melt in the water and thereby form an emulsion of the waxy material therein. The freshly prepared wax emulsion was then employed without being cooled to solidify the dispersed material as indicated hereinafter.

About 96%, by weight of the insecticidal material in the dispersed phase of the emulsion was incompatible with the other components thereof, and upon cooling of the emulsion to room temperature would normally start to precipitate from the emulsion at about 66° C.

*Polymer Latex I.*—A latex containing a dispersed acrylic resin was prepared as follows: A reaction flask was first charged with 836 parts of room temperature water, and 4.5 parts of Igepal CO–880, a nonionic dispersing agent, 38.4 parts of Aerosol 22, an anionic dispersing agent, and .05 part of ammonium persulfate, a polymerization initiator, were added thereto. (Aerosol 22 is marketed by American Cyanamid Company and is a 35% aqueous solution of tetrasodium N-(1,2-dicarboxylethyl)-N-octadecylsulfosuccinamate. Igepal CO–880 is nonylphenoxypoly (ethyleneoxy) ethanol, and is marketed as a noionic dispersing agent by the Antara Division of General Aniline and Film Corporation.) The aqueous solution was then heated to 70° C., and one-third by weight of a polymerizable monomeric material composed of a mixture of 75.6 parts ethyl acrylate, 42.0 parts styrene and 2.4 parts glacial acrylic acid was dispersed in the aqueous solution. The temperature of the system was then raised to 82° C. The system was then refluxed at this temperature as the balance of the monomeric material was added to the flask at the rate of 3 parts per minute. Following the complete addition of the monomeric material to the flask the temperature was raised to 90–95° C. and retained thereat for 30 minutes to complete the polymerization. Throughout the procedure the contents of the flask were continuously stirred. The resulting polymer latex was then cooled to room temperature, and employed as indicated hereafter.

*Alkali Soluble Resin Solution I.*—An alkaline solution of an alkali soluble resin for use in preparing the finished coating compositions was prepared by dissolving 12 parts of Waterez 1582 in an alkaline solution composed of six parts of 26° Bé. aqueous ammonia in 82 parts water. Waterez 1582 is an alkali soluble resin offered for use in self-polishing compositions by the Reichhold Chemical Company, Inc. of Elizabeth, New Jersey, and is a condensation product of phthalic anhydride with polyols.

*Self-Polishing Coating Composition "A."*—A water based coating composition was prepared using Wax Emulsion I and Polymer Latex I in its preparation as follows: Immediately after the formation of Wax Emulsion I and while the emulsion was at about 98° C., 66.25 parts of the room temperature latex were added to 15 parts of the wax emulsion. Thereafter, the resulting dispersion was permitted to cool to room temperature and was employed as a base dispersion in the preparation of the water-based self-polishing coating composition.

The finished composition was prepared from the base dispersion by adding 18.75 parts of Alkali Soluble Resin Solution I, 0.5 part tributoxyethyl phosphate (plasticizer) and 0.5 part diethylene glycol monoethyl ether (plasticizer), to the base dispersion. The finished coating composition when applied to flooring materials dried to a bright filimous coating which was insecticidal.

Although about 96% of the insecticidal material initially incorporated in the preparation of the wax emulsion was incompatible, and would normally precipitate from the emulsion upon cooling the emulsion to room temperature, the mixture resulting from the addition of the latex to the freshly prepared emulsion was devoid of precipitated material upon being cooled to room temperature.

Tests to determine the insecticidal activity of coatings obtained from the coating composition were made by uniformly coating vinyl asbestos tiles with the coating composition and allowing the coatings to dry for a period of 48 hours. The tiles were then exposed to adult German roaches under control conditions and the number of dead and dying roaches determined at intervals of 24 hours. After 24 hours exposure it was determined that 87.5% of the roaches were dead or dying, and that 90% were dead or dying after exposure for 72 hours.

*Example II*

*Wax Emulsion II.*—A wax emulsion containing an incompatible amount of dieldrin was prepared utilizing the procedure followed for preparing Wax Emulsion I except for the substitution of 16 parts of dieldrin for the 16 parts of lindane employed in the procedure. The freshly prepared emulsion was used as indicated hereafter.

*Polymer Latex II.*—A styrene resin containing latex was prepared by the procedure used for preparing Polymer Latex I except that the monomeric material employed in the polymerization process was styrene, 120 parts of the styrene monomer being used in place of the amount of monomeric material employed in the procedure.

*Self-Polishing Coating Composition "B."*—A self-polishing water-based coating was prepared from Wax Emulsion II and Polymer Latex II by mixing 66.25 parts of the Polymer Latex II with 15 parts of Base Emulsion II. The emulsion was mixed with the latex immediately after its preparation and while at a temperature of 98° C., the latex having been previously prepared and cooled to room temperature. The resulting dispersion was then cooled to room temperature and employed as a base dispersion in the preparation of a water-based self-polishing coating composition. Although containing an incompatible amount of dieldrin which would normally precipitate upon the cooling of the wax emulsion, in the absence of the latex polymer, the dispersion resulting from the admixture of the latex therewith was nevertheless stable upon having cooled to room temperature and showed no signs of precipitation.

A finished coating composition which was driable to a bright protective filimous insecticidal coating was then prepared from the wax dispersion resulting from the admixture of the latex and the emulsion by adding 18.75 parts of Alkali Soluble Resin Solution I, 0.7 part of tributoxy ethyl phosphate and 0.7 part dibutyl phthallate to the dispersion. Tiles were then tested for insecticidal activity as indicated in Example I, and the test results indicated that the coatings were insecticidally active, 95% of the roaches exposed to the coated tiles being dead or dying after 24 hours exposure, and 100% being dead or dying after 48 hours exposure.

*Example III*

*Polymer Latex III.*—A room temperature dispersion of 35 parts styrene in 60 parts water was prepared using 1.5 parts of a sulfated fatty alcohol and 3.0 parts of an alkyl phenoxy polyethoxy ethanol as the dispersing agents in the aqueous system. Polymerization of the monomeric material was then initiated by adding 0.25 part of potassium persulfate and 0.25 part sodium bisulfite to the aqueous dispersion. After the initiators were added the exothermic polymerization reaction caused the temperature to rise to about 75° C., and this temperature was maintained by the addition of external heat until the polymerization was completed and the free monomer content of the resulting latex was less than 0.5%.

The resulting latex was usefully employed in the process of the instant invention, and when mixed, in accord with the process, with a freshly prepared wax emulsion which contained an incompatible amount of lindane in the dispersed phase exhibited an apparent maximum solubility for the available lindane of approximately 1% on the weight basis of the polymer content of the latex. A dispersion formed by mixing 10 parts of freshly prepared Wax Emulsion I (at 98° C.) with 90 parts of polymer Latex III (at 25° C.) is an acceptable base for use in self-polishing coating compositions which contain a high percentage of an emulsion polymer. The insecticidal material in the resulting mixture is maintained in the dispersed film forming material and shows no evidence of precipitating after the dispersion has been cooled to room temperature and held thereat for extended periods. The dispersion resulting may be employed as a base for a self-polishing coating composition which is driable to a bright insecticidal film and additional insecticide added thereto as incorporated in latex polymers by the process described in my copending application.

*Example IV*

*Polymer Latex IV.*—A latex containing a resinous homopolymer of ethyl acrylate was prepared by following the redox polymerization procedure used in preparing Polymer Latex III substituting a like amount of ethyl acrylate for the styrene monomer employed in the procedure.

The resulting latex may be usefully employed in the process of the invention, and the resinous polymer has an apparent maximum solubility for lindane, when the latex is admixed with a waxy material containing emulsion that contains an incompatible amount of the lindane, of approximately 22%, based on the weight of the polymer.

A base dispersion in which the lindane is stabilized in the dispersed base and which is suitable for use in preparing residual insecticide containing self-polishing coating compositions of the type contemplated herein may be prepared by the process of the invention by mixing 25 parts of Polymer Latex IV (at 25° C.) with 75 parts of freshly prepared Wax Emulsion I (at 98° C.) and by thereafter cooling the resulting dispersion to room temperature.

*Example V*

*Polymer Latex V.*—A latex containing a resinous homopolymer of methyl methacrylate was prepared by the following redox polymerization procedure: A room temperature aqueous dispersion of 35 parts of methyl methacrylate in 61 parts of water was prepared using 2.2 parts Igepal CO–880, and .77 part of Aerosol 22 as the emulsifying or dispersing agents for the system. Polymerization of the dispersed monomeric material was initiated by adding 0.5 part ammonium persulfate and 0.5 part sodium bisulfite, and the temperature of the reaction mixture was permitted to rise to about 75° C. The system was maintained at this temperature until the polymerization was complete and the free monomer content was less than 0.5% by weight of the polymer produced.

The resulting latex polymer had an apparent maximum solubility for lindane of about 3%, based on the weight of the polymer, when the latex was mixed with a freshly prepared wax emulsion that contained an incompatible amount of lindane which would normally precipitate from the waxy material containing emulsion upon being cooled in the absence of the polymer latex addition thereto.

A stable dispersion containing particles of waxy material and discrete particles of the latex polymer and wherein the lindane is present in the dispersed phase of the mixture may be prepared by mixing 70 parts of Polymer Latex V (at 25° C.) with 30 parts of freshly prepared Wax Emulsion I (at 98°) and thereafter cooling the mixture to room temperature. The room temperature dispersion is entirely acceptable for use in preparing a residual inseticide containing self-polishing coating composition, and additional insectcide containing polymer latex and an alkaline solution of an alkali soluble resin may be admixed therewith in the formulation of a finished coating composition of the dry-bright type.

*Example VI*

*Polymer Latex VI.*—A latex suitable for use in the process disclosed herein and containing a resinous homopolymer of 2-ethylhexyl acrylate was prepared in accord with the procedure followed in preparing Polymer Latex V except for the substitution of 35 parts of 2-ethylhexyl acrylate for the amount of methyl methacrylate employed in the procedure. The resulting polymer had an apparent maximum solubility for lindane of about 12%, based on the weight of the polymer, when the latex was mixed with a wax emulsion containing an incompatible amount of the insecticidal material precipitated from the emulsion.

An aqueous dispersion of film forming materials suitable as a base component for a water-based coating composition which is driable to a bright filimous coating which is insecticidal may be prepared by mixing 40 parts of room temperature Polymer Latex VI with 60 parts of freshly prepared Wax Emulsion I, and by thereafter cooling the mixture to room temperature.

*Example VII*

*Wax Emulsion III.*—A wax extender containing emulsion having an incompatible amount of lindane in the dispersed phase was prepared as follows: A melt which was composed of a mixture of 22.1 parts of Epolene LVE, 19.4 parts of Durez 219 and 4.3 parts of oleic acid was prepared by heating the components together in a suitable vessel. Durez 219 is a wax extender commonly employed in the preparation of water-based self-polishing coating compositions and is an oil soluble high melting point thermoplastic terpene phenolic resin which is insoluble in water and is marketed by the Durez Plastic Division of the Hooker Chemical Corporation of North Tonowanda, New York. It has an acid value of 65–70 and a melting point of 152–156 ° C. After melting the waxy materials the melt was cooled to 113–116° C., and 16 parts of lindane added and melted therein. Thereafter the melt was cooled to 99° C., and an alkaline solution of 2.8 parts Borax and 0.2 part caustic potash in 30 parts water was added to and stirred into the melt to emulsify the water therein. Thereafter 6.2 parts of morpholine was added and stirred into the melt to form a soap with the oleic acid. The dispersible melt was then rapidly added to 300 parts of boiling water with vigorous agitation to form an aqueous emulsion of the waxy material. About 58% by weight of the lindane incorporated in the melt would normally precipitate from the emulsion upon cooling the emulsion to room temperature. However, prior to cooling the emulsion to the point where the precipitation occurs, the freshly prepared emulsion may be employed in the process of the invention by mixing a resinous polymer latex therewith.

Any one or more of the Polymer Latexes I, II, III, or IV may be added to the freshly prepared wax emulsion and in sufficient quantities to dissolve the incompatible or available amount of lindane. The resulting dispersion may thereafter be cooled to room temperature to form a dispersion suitable as a base for a self-polishing coating composition and to which may be added plasticizers and another latex polymer.

*Example VIII*

*Wax Emulsion IV.*—A wax extender containing emulsion having an incompatible amount of lindane in the dispersed phase may be prepared by following the identical procedure indicated for Wax Emulsion III except for the substitution of 7 parts of oleic acid and 6.2 parts of morpholine for the amounts indicated for these materials, and by using 19.4 parts of a commercial wax extender called Piccoumarone 420–S as a substitute for the Durez 219 in the procedure. Piccoumarone 420–S is a synthetic thermoplastic water insoluble paracoumarone-indene resin marketed for use in water-based coating compositions by the Pennsylvania Industrial Chemicals Corporation of Clairton, Pennsylvania. 45.5% by weight of the lindane in the dispersible melt thus prepared, will normally precipitate from the wax emulsion upon cooling the emulsion in the absence of a latex polymer, and accordingly is incompatible with the dispersed components thereof.

Suitable amounts of any one or mixtures of two or more Polymer Latexes I, II, III, or IV may be added to the freshly prepared emulsion before cooling the emulsion to the point of incipient precipitation of the insecticidal material to obtain a dispersion of film forming material suitable as a base for a residual insecticide containing self-polishing coating composition. To stabilize all of the available lindane in the dispersed material of the mixture and to thus avoid the necessity for filtering the mixture to remove undissolved insecticides which would otherwise precipitate from the mixture, the amount of latex added should be sufficient to prevent such precipitation of the insecticide upon cooling of the mixture.

*Example IX*

A water-based coating composition which is driable to a bright filimous protective coating that is insecticidal to ants, roaches and the like insect life may be prepared from commercially available materials as follows: A wax emulsion is prepared by first melting 117.5 parts Epolene LVE, 117.5 parts Cardis Polymer 10, 56.75 parts oleic acid and 100 parts lindane together to form a melt at a temperature of about 116–120° C. The melt is then cooled to 98–99° C., and a boiling solution of 16.5 parts Borax and 1.25 parts caustic potash in 189.23 parts of water added thereto and emulsified therein by stirring. The temperature of the melt is then adjusted to 100° C. and stirred for about 5 minutes. Thereafter 43.75 parts of morpholine are slowly added to the melt with stirring while holding the temperature of the wax constant at 100° C. The melt is then stirred for about 5 minutes to permit the formation of the soap, and the dispersible melt is then rapidly added with vigorous agitation to 1880 parts water to obtain the freshly prepared wax emulsion.

In accord with the process portion of the lindane which would normally precipitate from the wax emulsion upon cooling is prevented from precipitating by adding 1740 parts of a commercially available latex known as Neo Cryl CC–6 to the freshly prepared emulsion. (Neo Cryl CC–6 is an aqueous dispersion containing 40% by weight of a resin derived by the copolymerization of monomeric material which includes acrylic and methacrylic acids, acrylic acid esters, styrenes, as well as vinyl toluene, acrylamide and acrylonitrile. It is marketed by Polyvinyl Chemicals, Inc. of Peabody, Massachusetts.) The resulting dispersion is then cooled to room temperature and employed as a base for the finished composition.

The finished coating composition is then prepared therefrom by mixing the base dispersion with an aqueous mixture consisting of 7800 parts water to which has been added 1603 parts Neo Cryl CC–6 (40% polymer) and 3153.75 parts of an aqueous solution of 378.5 parts Waterez and 189.25 parts aqua ammonia (26° Bé.) in 2586 parts water.

The finished coating composition is driable to a bright protective insecticidal coating and is usefully employed as a self-polishing seal for terrazzo, concrete, brick and synthetic floor coverings.

The amount of insecticidal material in the finished coating compositions should be in excess of 2 parts of lindane and/or dieldrin per 100 parts of total solids in the finished compositions in order to obtain coatings where are effectively insecticidal, total solids having reference herein to the components of the finished compositions which enter into the final make-up of the dry coatings obtained therefrom as is well known. On the other hand, and because of the toxicity of such insecticidal materials, it is recommended that the insecticide be initiated in the finished composition in amounts which are less than 8 parts per 100 parts of total solid, preferably about 6 parts insecticide per 100 parts of total solids. Such compositions typically have a total solids content which may suitably range from 10 to 20 parts total solids per 100 parts of finished composition when prepared from dispersions produced by the process herein. From the foregoing description and examples, it is evident that all or a portion of the insecticidal material may be incorporated in the finished coating compositions by the process set forth herein. It is contemplated, however, that in most instances of use, the process will be employed as the means for incorporating all of the insecticidal material in the dispersed components of the finished composition because of the ease with which the process may be embodied in current compounding procedures.

The amount of waxy material employed in the formation of the dispersible melts need be only sufficient to enable the subsequent dispersing of the insecticidal material in hot water to form the emulsion and may suitably constitute as low as 15 parts per 100 parts of film forming material in the melt, or lower, all parts set forth herein being by weight.

Water-based dry bright residual insecticide containing coating compositions prepared by the process described herein may contain widely varying components in various amounts. They may or may not contain alkali soluble resins, for example, or plasticizers, or other modifying agents frequently included in the finished compositions, and may contain high or low amounts of waxy materials.

While only certain preferred embodiments of this invention have been shown and described by ways of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a method of preparing an insecticide containing water-based, self-polishing, coating composition wherein the insecticide contained therein is a member of the group consisting of lindane and dieldrin, the improvement comprising preparing a dispersible melt which includes the insecticidal member of said group and normally solid meltable waxy material, said member being included in said melt in an amount exceeding its dispersed solid phase compatibility with said waxy material, dispersing said melt in hot water to form an aqueous emulsion thereof, thereafter cooling said aqueous emulsion to solidify the dispersed components thereof, and, prior to incipient precipitation of the insecticidal member from said emulsion, mixing an aqueous emulsion polymerization latex product therewith, said latex product comprising dispersed resinous polymeric material composed predominately of monomer units derived from members of the group consisting of styrene, the methacrylic acid esters of the monohydric alcohols having from 1 to 18 carbon atoms, and the acrylic acid esters of said monohydric alcohols.

2. In a method of preparing an insecticide containing water-based, self-polishing, coating composition wherein the insecticide contained therein is lindane, the improvement in accord with claim 1, wherein said dispersed resinous polymeric material is acrylic resinous material.

3. In a method of preparing an insecticide containing water-based, self-polishing, coating composition wherein the insecticide contained therein is lindane, the improvement in accord with claim 1 wherein said dispersed resinous polymeric material is styrene resinous material.

4. In a method of preparing an insecticide containing water-based, self-polishing, coating composition wherein the insecticide contained therein is dieldrin, the improvement in accord with claim 1 wherein said dispersed resinous polymeric material is acrylic resinous material.

5. In a method of preparing an insecticide containing water-based, self-polishing, coating composition wherein the insecticide contained therein is dieldrin, the improvement in accord with claim 1 wherein said dispersed resinous polymeric material is styrene resinous material.

6. A water-based, self-polishing, coating composition comprising a continuous aqueous phase, particles of normally solid meltable waxy material dispersed in said phase and containing an insecticide selected from members of the group consisting of lindane and dieldrin in solid solution therewith, and discrete particles of synthetic resinous polymeric material dispersed in said phase and having an insecticide selected from members of said group dissolved therein, said resinous material being an aqueous emulsion polymerization product composed predominately of monomer units derived from members of the group consisting of styrene, the methacrylic acid esters of the monohydric alcohols having from 1 to 18 carbon atoms, and the acrylic acid esters of said monohydric alcohols.

7. A water-based, self-polishing, coating composition in accord with claim 6 wherein the insecticide in the particles dispersed in said aqueous phase is lindane and said synthetic resinous material is styrene resinous material.

8. A water-based, self-polishing, coating composition in accord with claim 6 wherein the insecticide in the particles dispersed in said aqueous phase is lindane and said synthetic resinous material is acrylic resinous material.

9. A water-based, self-polishing, coating composition in accord with claim 6 wherein the insecticide in the particles dispersed in said aqueous phase is dieldrin and said synthetic resinous material is styrene resinous material.

10. A water-based, self-polishing, coating composition in accord with claim 6 wherein the insecticide in the particles dispersed in said aqueous phase is dieldrin and said synthetic resinous material is acrylic resinous material.

References Cited in the file of this patent

UNITED STATES PATENTS

| | | |
|---|---|---|
| 2,441,553 | Britton | May 18, 1948 |
| 2,556,451 | Smith | June 12, 1951 |
| 2,966,440 | Gerolt | Dec. 27, 1960 |
| 3,008,871 | Feinberg | Nov. 14, 1961 |
| 3,018,217 | Bruce | Jan. 23, 1962 |

FOREIGN PATENTS

| | | |
|---|---|---|
| 221,469 | Australia | Apr. 24, 1958 |
| 592,670 | Great Britain | Sept. 25, 1947 |
| 758,019 | Great Britain | Sept. 26, 1956 |